United States Patent
Picht et al.

(10) Patent No.: US 6,290,874 B1
(45) Date of Patent: Sep. 18, 2001

(54) DISPLAY SCREEN COMPRISING A METAL OXIDE-CONTAINING PHOSPHOR COMPOSITION

(75) Inventors: Friederike Picht, Düren; Wolfram Czarnojan; Hans-Otto Jungk, both of Aachen, all of (DE); Gerard H. J. Van Iersel, Eindhoven (NL); Miguel Boutelje, Eindhoven (NL); Pierre L. H. M. Cobben, Eindhoven (NL); Antonius A. M. Van Weert, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/483,976

(22) Filed: Jan. 18, 2000

(30) Foreign Application Priority Data

Jan. 16, 1999 (DE) .............................. 199 01 538

(51) Int. Cl.$^7$ .................................. C09K 11/02
(52) U.S. Cl. ....................... 252/301.4 R; 252/301.4 S; 252/301.4 H; 252/301.4 P; 252/301.4 F; 252/301.5; 252/301.6 R; 252/301.6 S; 252/301.6 F; 252/301.6 P; 313/641

(58) Field of Search .................... 313/641; 252/301.4 R, 252/301.4 F, 301.4 P, 301.4 H, 301.4 S, 301.5, 301.6 R, 301.6 S, 301.6 P, 301.6 F; 428/403, 404; 427/215, 218, 219

(56) References Cited

U.S. PATENT DOCUMENTS 5,723,224 * 3/1998 Toki et al. ................... 252/301.4 R
6,077,458 * 6/2000 Shiiki et al. .................. 252/301.4 R

FOREIGN PATENT DOCUMENTS 7-268318 * 10/1995 (JP) .

* cited by examiner

Primary Examiner—C. Melissa Koslow

(57) ABSTRACT

A display screen comprising a phosphor composition which includes a phosphor and a phosphor coating with a group of metal-oxygen compounds, the group of metal-oxygen compounds containing an yttrium-oxygen compound, is characterized by a surprising improvement in picture brightness, color purity and adhesion of the phosphor composition to the glass of the display screen. The phosphor layer exhibits a high packing density of the phosphor material. The phosphor layer further exhibits a good homogeneity and is free from "pinholes". In addition, the structured phosphor layer shows a high definition.

3 Claims, 1 Drawing Sheet

DISPLAY SCREEN COMPRISING A METAL OXIDE-CONTAINING PHOSPHOR COMPOSITION

BACKGROUND OF THE INVENTION

The invention relates to a display screen, in particular a display screen for a cathode ray tube, comprising a phosphor composition which includes a phosphor and a phosphor coating with a group of metal-oxygen compounds.

Display screens of cathode ray tubes are provided on the inner surface with a structured display screen coating containing a phosphor composition in dot-shaped or stripe-shaped pixels. These pixels are always arranged so as to form triads. Each triad comprises a pixel with a phosphor for each one of the three primary emission colors red, blue and green. The display screen coating is customarily applied to the glass of the screen by means of a photochemical process. In the wet-chemical variant of said photochemical process, a photosensitive phosphor suspension is employed which contains the phosphor and ammonium dichromate as the photo-active component in a polyvinyl alcohol solution, which is cured by exposure using a shadow mask. In the dry variant of the photochemical process, photosensitive lacquers are employed which become sticky upon exposure. After said exposure using a shadow mask, the dry phosphor powders adhere to the sticky lacquer surfaces.

In a display screen coating, the phosphors should exhibit a high packing density, so that an optimum brightness of the display screen can be attained. In addition, the phosphor in the display screen coating should be homogeneously distributed, i.e. the photosensitive phosphor suspensions should not form reams and "pinholes" in the drying process. The individual pixels in the display screen coating should exhibit a high definition and accurately reproduce the shadow mask structure. The colors of the phosphors should retain their color purity in the coating process. In addition, the display screen coating should adhere well, and the non-exposed regions of the display screen should be haze-free.

A pre-requisite for a good display screen coating is, inter alia, a phosphor composition which can be readily processed. The phosphor composition should exhibit good sieving properties and a high dispersibility. In suspension, the phosphor composition should exhibit a stable particle size distribution, and it should be readily filterable in all pH ranges.

In order to adapt the properties of the phosphor composition to the requirements of the production process for cathode ray tubes, the phosphor powders are customarily coated with materials which should guarantee the desired technological properties of the phosphor composition.

EP-A-0 432 500 discloses a phosphor for cathode ray tubes, which comprises phosphor particles, a first layer on the surface of the phosphor particles, which layer consists of a substantially uniform $SiO_2$ film, and a second layer on the first layer, which second layer comprises at least a metal selected from the group formed by Zn, Al and the alkaline earth metals and at least one element of the group composed of colloidal silicon oxide, aluminum oxide-sol and titanium oxide-sol having a particle size $\leq 50$ nm.

At present, however, ever higher requirements are imposed on the quality of display screens as regards brightness, color purity, freedom from reams and definition. Consequently, also the quality requirements for phosphor compositions increase accordingly.

OBJECTS AND SUMMARY OF THE INVENTION

Therefore, it is an object of the invention to provide a display screen which is characterized by a higher brightness, higher color purity, freedom from reams and a higher definition.

In accordance with the invention, this object is achieved by a display screen comprising a phosphor composition which includes a phosphor and a phosphor coating containing a group of metal-oxygen compounds, the group of metal-oxygen compounds comprising an yttrium-oxygen compound. Such a display screen is characterized by a surprising improvement in picture brightness, color purity and adhesion of the phosphor composition to the glass of the display screen. The phosphor layer exhibits a high packing density of the phosphor material. The phosphor layer further exhibits a good homogeneity and is free from "pinholes". In addition, the structured phosphor layer shows a high definition.

The group of metal-oxygen compounds may additionally include a zinc-oxygen compound.

The group of metal-oxygen compounds may also additionally include an alkaline earth metal-oxygen compound.

The group of metal-oxygen compounds may also additionally include a silicon-oxygen compound.

Within the scope of the invention it is particularly preferred that the group of metal-oxygen compounds comprises yttrium oxide, zinc oxide and a colloidal silicon oxide.

It may alternatively be preferred that the phosphor composition comprises an yttrium-oxygen compound in a quantity ranging from 0.01 to 0.50 wt. % with respect to the phosphor content.

It may further be preferred that the phosphor composition comprises 0.01 to 0.50 wt. % of an alkaline earth metal-oxygen compound with respect to the phosphor content, 0.01 to 0.50 wt. % of a zinc-oxygen compound with respect to the phosphor content, 0.01 to 0.50 wt. % of an yttrium-oxygen compound with respect to the phosphor content, and 0.01 to 1.0 wt. % of a silicon-oxygen compound with respect to the phosphor content.

The invention also relates to a phosphor composition comprising a phosphor and a phosphor coating containing a group of metal-oxygen compounds, the group of metal-oxygen compounds comprising yttrium oxide.

These and other aspects of the invention will be apparent from and elucidated with reference to the embodiments described hereinafter.

DESCRIPTION OF THE PREFERRED EMBODIMENTS

Figure 1:
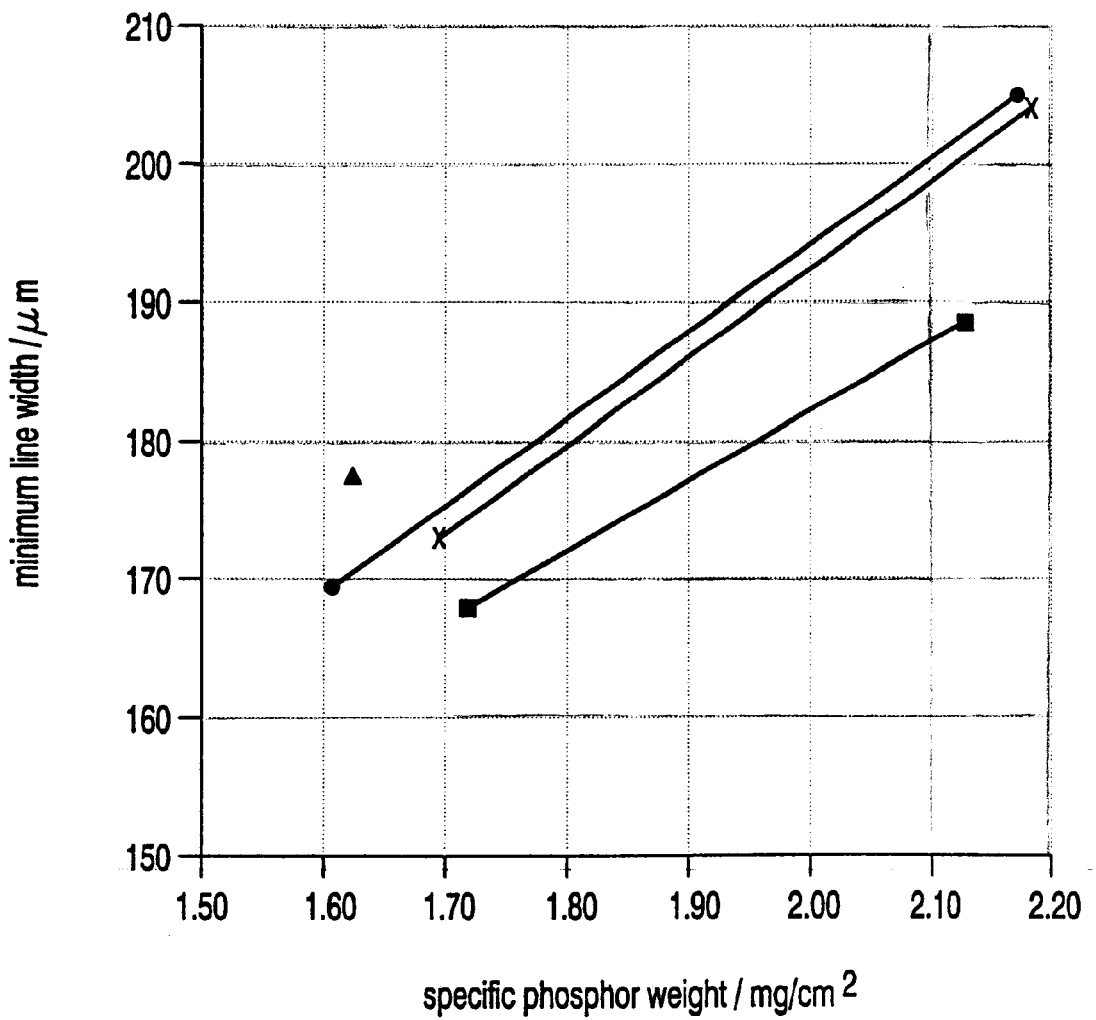
FIG. 1 compares the adhesion of a phosphor composition containing yttrium oxide to that of three phosphor compositions without yttrium oxide.

A display screen in accordance with the invention comprises a phosphor layer which includes a phosphor composition of a phosphor and a phosphor coating with which the phosphor is coated.

For the phosphor composition in accordance with the invention, all customary phosphors can be used, for example blue Zns:Ag,Al, blue ZnS:Ag,Cl, green ZnS:Cu,Au,Al, green ZnS:Cu,Al or red $Y_2O_2S$:Eu. The starting material may also be an already pigmented phosphor, which is coated with color filter pigments to improve the picture contrast. Such pigmented phosphors are, for example, $CoAl_2O_4$-pigmented ZnS:Ag,Al or $Fe_2O_3$-pigmented $Y_2O_2S$:Eu. The color filter pigment may either be applied together with the phosphor coating in a single coating process or form a separate coating layer.

The phosphor coating includes a group of metal-oxygen compounds, which contains an yttrium-oxygen compound. Within the scope of the invention, "metal-oxygen compounds" are to be taken to mean the hydroxides and oxides of the corresponding metal. The group of metal-oxygen compounds may also comprise a zinc-oxygen compound and an alkaline earth metal-oxygen compound. The phosphor coating preferably also contains a silicon-oxygen compound, for example silicon dioxide, which may be in the form of fine-grain colloidal $SiO_2$ particles having a particle size of 4 nm$\leq$d$\leq$30 nm or in the form of coarse-grain colloidal $SiO_2$ particles having an average particle size of 50 nm$\leq$d$\leq$150 nm. The phosphor coating may optionally contain one or more water-soluble organic binders, for example anionic binders, such as polyacrylates and alginates, binders with non-ionic amide and urethane groups, such as polyurethanes, polyacryl amides, polyamide resins, etherified melamine and melamine-formaldehyde compounds, etherified urea-formaldehyde resins or gelatin. The weight ratio between the phosphor coating and the phosphor in the phosphor composition may preferably range from 0.10 wt. % to 2.0 wt. %.

The phosphor composition may be prepared by successively carrying out the following process steps:

a) First, the pH-value of a slurry of a phosphor in water is set to at least 9 by means of diluted ammonia. In the subsequent wet-chemical grinding process, the phosphor is dispersed. For the dispersing agent use can be made of a silicate, for example potassium-water glass, or a fine-grain $SiO_2$ colloid with a particle size of 4 nm$\leq$d$\leq$30 nm. The quantity of the ionic or fine-grain silicon dioxide (calculated as $SiO_2$) may preferably range from 0.010 wt. % to 0.15 wt. % with respect to the phosphor. Alternatively, use may be made of a different dispersing agent, for example a polycarboxylate. If necessary, the wet-chemical pigmentation of the phosphor may be carried out at the same time as the grinding of the phosphor, in that, for example, a polyacrylate-stabilized pigment suspension is added to the aqueous phosphor slurry, and the phosphor and the pigment suspension are jointly ground without adding further dispersing agents.

b) Aqueous solutions of one or more organic binders may be added to the dispersed phosphor. The overall quantity of the organic binder material may range from 0.010 wt. % to 0.50 wt. % with respect to the phosphor. The solution of a coarse-grain $SiO_2$ colloid having an average particle size of 50 nm$\leq$d$\leq$150 nm, corresponding to a specific surface area of 25 m$^2$/g$\leq$A$_s$$\leq$70 m$^2$/g, may be added to the phosphor slurry. The quantity of this coarse-grain SiO2 colloid (calculated as $SiO_2$) customarily ranges from 0.01 wt. % to 1.0 wt. % with respect to the phosphor. The coarse-grain $SiO_2$ colloid may be previously mixed with a solution of an yttrium compound which forms $Y_2O_3$ when it is heated, such as yttrium nitrate or yttrium chloride. The weight ratio of silicon dioxide (calculated as $SiO_2$) to the yttrium compound (calculated as $Y_2O_3$) customarily ranges from 2:1 to 5:1. Subsequently, the yttrium-modified $SiO_2$ colloid is added to the phosphor slurry. If necessary, in process step b) also the wet-chemical pigmentation of the phosphor may be carried out by adding a pigment suspension which is dispersed with, for example, polyacrylate. The addition of organic binder components, colloidal $SiO_2$ as well as the pigment may take place in any desired order.

c) One or more aqueous salt solutions of one or more of the elements selected from the group formed by the alkaline earth elements, zinc and yttrium, for example their nitrates, chlorides and acetates, are added to the phosphor slurry. The weight ratio of silicon dioxide to the overall quantity of metal oxides customarily ranges from 1:2 to 10:1.

d) By means of diluted acid, for example $HNO_3$, $H_2SO_4$, HCl or $CH_3COOH$, the pH-value of the phosphor slurry is reduced to at least pH=6, if this value is not yet reached.

e) By means of an ammoniacal solution, diluted caustic potash solution or caustic soda solution, the pH-value of the phosphor slurry is raised to at least pH=8.0.

f) The phosphor thus coated is allowed to sediment. Subsequently, it is decanted and, if necessary, washed and filtered-off.

g) The phosphor composition is dried in air for several hours at a temperature ranging from 110 to 200° C.

The display screen may be coated with the phosphor composition by means of, for example, the "flow coating" method. In this case, the phosphor composition comprising an emission-color phosphor is suspended in a binder solution photo-activated by means of ammonium dichromate (ADC). The individual components of the phosphor suspension, i.e. phosphor powder, water, binding agent, dispersing agent, stabilizer and light-sensitive components are mixed in accordance with a defined recipe, in a predetermined order and concentration depending upon the phosphor used and the processing conditions of the suspension in the display screen process. The suspension of the phosphor composition is applied to the inner surface of the prepared glass plate of the display screen rotating in the "flow coating" machine. As a result of the rotation of the display screen, the phosphor suspension is uniformly distributed on the display screen. Any excess suspension is removed by centrifuging. The moist phosphor layer thus formed is dried. The inner surface of the glass plate of the display screen is provided with a shadow mask which is arranged at some distance from the phosphor layer. Through this shadow mask, the phosphor layer is irradiated with ultraviolet light, causing the irradiated areas of the phosphor layer to cure. The phosphor layer is developed by means of hot water, i.e. the parts of the phosphor layer which are not cured are removed. The structured phosphor layer is dried.

These process steps are successively carried out with three phosphor compositions comprising phosphors emitting in green, blue and red. Subsequently, the display screen is baked out at approximately 440° C. in order to remove the organic binders still present in the phosphor layer.

EXAMPLE 1

A quantity of 800 g of green-luminescing ZnS:Cu,Au,Al is decanted after washing with water and wet-screening. The pH-value is set to 9.3 by means of diluted ammonia. A quantity of 10.67 g of a 3.0% solution of a fine-grain $SiO_2$ colloid having a particle size of 4 nm$\leq$d$\leq$130 nm is added as the dispersing agent. After adding grinding bodies, this phosphor suspension is subjected to a wet-grinding process. After grinding for one hour, the pH-value is reset to pH=9.0 by means of diluted ammonia. After wet-grinding for another hour, the grinding bodies are separated and diluted with water to a suspension volume of 2.41. After the wet-screening process, the stabilized phosphor suspension is obtained. A quantity of 48.1 g of a 1.0% urea-formaldehyde-resin solution is added to the properly dispersed suspension of ZnS:Cu,Au,Al phosphor having a pH-value of 8.0. The phosphor suspension is stirred for 10 minutes. Meanwhile, 8.0 g of a 10% $Y(NO_3)_3$ solution (calculated as $Y_2O_3$) is added to 106.7 g of a 3.0% solution of a coarse-grain $SiO_2$ colloid having a particle size of 50 nm$\leq$d$\leq$150 nm, as a result of which addition the pH-value decreases from 9.9 to 6.0. This yttrium-modified silica sol is subsequently added to the phosphor suspension, thereby causing the pH-value to be reduced to pH=6.2. After stirring for 5 minutes, 12.0 g of a 4.0% $ZnSO_4$ solution (calculated as ZnO) is added to the phosphor suspension. The phosphor suspension is again stirred for 5 minutes. Subsequently, 1 molar $H_2SO_4$ is used to set the pH-value to 3.5. After stirring for 10 minutes, the pH-value is increased to 8.5 by means of diluted ammonia. After the phosphor suspension has been stirred for 15 minutes, the suspension of the coated ZnS:Cu,Au,Al phosphor is allowed to sediment, whereafter it is decanted and washed once with 1.6 l water. Finally, the coated phosphor is filtered off and dried in air at 120° C. for 16 hours.

EXAMPLE 2

A quantity of 800 g of a green-luminescing ZnS:Cu,Au,Al is dispersed, as described in example 1, using 10.67 g of a 3.0% solution of a fine-grain $SiO_2$ colloid having a particle size of 4 nm$\leq$d$\leq$30 nm as the dispersing agent. A quantity of 32.0 g of a 1% solution of a polyurethane resin having a molecular mass >10,000 is added to the properly dispersed suspension of the ZnS:Cu,Au,Al phosphor having a pH-value of 8.1. The phosphor suspension is stirred for 10 minutes. Meanwhile, 8.0 g of a 10.0% $Y(NO_3)_3$ solution (calculated as $Y_2O_3$) is slowly added to 106.7 g of a 3.0% solution of a coarse-grain SiO2 colloid having an average particle size of 50 nm$\leq$d$\leq$150 nm, thereby causing the pH-value to decrease from 9.9 to 6.1. This yttrium-modified silica sol is subsequently added to the phosphor suspension, thereby causing the pH-value to decrease to 6.3. After stirring again for 5 minutes, 12.0 g of a 4.0% $ZnSO_4$ solution (calculated as ZnO) is added to the phosphor suspension, thereby causing the pH-value to decrease to 5.5. Subsequently, a 1 molar $H_2SO_4$ solution is used to set the pH-value to 3.5. After stirring for 10 minutes, the pH-value is increased to 8.5 by means of diluted ammonia. After the phosphor suspension has been stirred for another 15 minutes, the coated phosphor is processed as described in example 1.

EXAMPLE 3

A quantity of 800 g of green-luminescing ZnS:Cu,Au,Al is dispersed, as described in example 1, with 10.67 g of a 3.0% solution of a fine-grain $SiO_2$ colloid having a particle size of 4 nm$\leq$d$\leq$30 nm as the dispersing agent. A quantity of 25.8 g of a 1% solution of a polyacrylic acid having a molecular mass of 75,000 is added to the properly dispersed suspension of the ZnS:Cu,Au,Al phosphor having a pH-value of 8.5, thereby causing the pH-value to decrease to 6.1. The phosphor suspension is stirred for 5 minutes. Next, a quantity of 30.4 g of a hot 0.5% sodium alginate solution is added to the phosphor suspension, which is stirred again for 5 minutes. A quantity of 87.9 g of a 3.0% solution of a coarse-grain $SiO_2$ colloid having an average particle size of 50 nm$\leq$d$\leq$150 nm is added to the phosphor suspension, which is stirred again for 10 minutes. A quantity of 28.0 g of a 10% $Y(NO_3)_3$ solution (calculated as $Y_2O_3$) and 24.0 g of a 4.0% $Zn(NO_3)_2$ solution (calculated as ZnO) are separately mixed and then added to the phosphor suspension. As a result, the pH-value decreases to 3.6. The phosphor suspension is stirred for 10 minutes. Finally, the pH-value is increased to 8.5 by means of diluted ammonia. After the phosphor suspension has been stirred for another 15 minutes, the suspension of the coated ZnS:Cu,Au,Al phosphor is allowed to sediment, after which it is decanted and washed 3 times with 1.6 l water. Finally, the coated phosphor is filtered off and dried in air for 18 hours at 120° C.

Measuring Results

The adhesion of phosphor compositions to a display screen is measured in that phosphor coatings comprising the phosphor compositions are applied to the screen glass by means of a flow-coating process. The phosphor coatings are provided in a pattern of decreasing line width and subsequently rinsed with water. The width of the narrowest, only just adhering, lines is measured and compared. The smaller the minimum line width, the better the adhesion of the phosphor composition to the display screen glass is.

FIG. 1 illustrates the positive influence of phosphor compositions in accordance with the invention comprising green-luminescing ZnS:Cu,Au,Al phosphor on the adhesion of the phosphor layer to the screen glass. Completely inorganic coating compositions of $SiO_2$ and ZnO (composition$_x$) as well as coating compositions of $SiO_2$ and ZnO to which organic binders are added (coating▲) and coatings which are similar to the inventive coatings, but which comprise, apart from $SiO_2$, ZnO and organic binders, lanthanum oxide instead of yttrium oxide (coating●), are inferior to the phosphor composition comprising an yttrium-oxygen compound (coating■) as regards the adhesion of the phosphor.

What is claimed is:

1. A display screen comprising a phosphor composition which includes a phosphor and a phosphor coating containing a group of metal-oxygen compounds, characterized in that the group of the metal-oxygen compounds comprises an yttrium-oxygen compound, and further characterized in that the group of the metal-oxygen compounds additionally includes an alkaline earth metal-oxygen compound.

2. A display screen comprising a phosphor composition which includes a phosphor and a phosphor coating containing a group of metal-oxygen compounds, characterized in that the group of the metal-oxygen compounds comprises an yttrium-oxygen compound, and further characterized in that the group of the metal-oxygen compounds comprises yttrium oxide, zinc oxide and a colloidal silicon oxide.

3. A display screen comprising a phosphor composition which includes a phosphor and a phosphor coating containing a group of metal-oxygen compounds, characterized in that the group of the metal-oxygen compounds comprises an yttrium-oxygen compound, and further characterized in that the phosphor composition comprises 0.01 to 0.50 wt. % of an alkaline earth metal-oxygen compound with respect to the phosphor content, 0.01 to 0.50 wt. % of a zinc-oxygen compound with respect to the phosphor content, 0.01 to 0.50 wt. % of an yttrium-oxygen compound with respect to the phosphor content, and 0.01 to 1.0 wt. % of a silicon-oxygen compound with respect to the phosphor content.

* * * * *